United States Patent [19]

Brinda et al.

[11] Patent Number: 5,543,002
[45] Date of Patent: Aug. 6, 1996

[54] METHOD OF MANUFACTURE OF HOLLOW FIBER FILTER CARTRIDGE WITH POROUS RING

[75] Inventors: Paul D. Brinda, Robbinsdale; Louis C. Cosentino, Deephaven, both of Minn.

[73] Assignee: Minntech Corporation, Minneapolis, Minn.

[21] Appl. No.: 296,728

[22] Filed: Aug. 26, 1994

Related U.S. Application Data

[62] Division of Ser. No. 885,149, May 18, 1992.

[51] Int. Cl.$^6$ .................................................. B01D 61/02
[52] U.S. Cl. .................... 156/77; 156/294; 156/304.2; 156/304.6; 156/309.9; 210/450; 210/497.01
[58] Field of Search ................... 210/450, 497.01; 156/77, 290, 304.2, 304.6, 309.9, 294, 293, 69

[56] References Cited

U.S. PATENT DOCUMENTS

| | | | |
|---|---|---|---|
| 2,625,499 | 11/1949 | Nebugon | 156/309.6 |
| 2,690,769 | 10/1954 | Brown | 156/309.6 |
| 2,782,806 | 2/1957 | Starbaugh et al. | 156/294 |
| 2,974,684 | 3/1961 | Ginsue et al. | 153/293 |
| 4,038,190 | 7/1977 | Baudet et al. | |
| 4,061,574 | 12/1977 | Clark . | |
| 4,132,650 | 1/1979 | Kirsch et al. | |
| 4,179,380 | 12/1979 | Amicel et al. | |
| 4,210,536 | 7/1980 | Coplan et al. | |
| 4,293,418 | 10/1981 | Fujii et al. | |
| 4,361,481 | 11/1982 | Schnell . | |
| 4,374,802 | 2/1983 | Fukasawa . | |
| 4,380,460 | 4/1983 | Otstot et al. | |
| 4,396,510 | 8/1983 | Hsei | 210/321.3 |
| 4,451,369 | 5/1984 | Sekino . | |
| 4,605,500 | 8/1986 | Takemura et al. | |
| 4,689,149 | 8/1987 | Kanno et al. | |
| 4,707,268 | 11/1987 | Shah . | |
| 4,720,342 | 1/1988 | Takemura et al. | |
| 4,781,832 | 11/1988 | Takemura et al. | |
| 4,990,251 | 2/1991 | Spranger et al. | |
| 5,053,130 | 10/1991 | Raff et al. | |
| 5,092,914 | 3/1994 | Cullen et al. | |
| 5,160,615 | 11/1992 | Takagi et al. | |
| 5,328,541 | 7/1994 | Usui et al. | 156/304.2 |
| 5,342,464 | 8/1994 | McIntire et al. | 156/293 |

FOREIGN PATENT DOCUMENTS

| | | |
|---|---|---|
| 61-093803 | 5/1986 | Japan . |
| 61-222510 | 10/1986 | Japan . |
| 62-124496 | 6/1987 | Japan . |

OTHER PUBLICATIONS

Rodriguez Principles of Polymer Systems, Copyright 1982, 1970 p. 326.

*Primary Examiner*—Michael W. Ball
*Assistant Examiner*—Sam Chuan Yao
*Attorney, Agent, or Firm*—Barbara A. Wrigley; Amelia A. Buharin

[57] ABSTRACT

A method of sealingly coupling a hollow fiber bundle having first and seconds ends to a porous collar having first and second peripheral edges, at least one of which is coupled to the inner ledge of a casing for encasing said bundle of hollow fibers is disclosed. The method broadly includes providing a porous collar having first and second outer peripheral edges; providing a casing having first and second longitudinal ends, the casing defining a central chamber, the chamber having first and second open ends wherein the longitudinal ends of the casing each include an inner lip proximal to the open end; coupling the first outer peripheral edge of the porous collar to the inner lip of the casing; retaining a bundle of hollow fibers having first and second longitudinal ends within the chamber; permeating the longitudinal ends of the hollow fiber bundle with a fluid impermeable material; joining the porous collar to the fluid impermeable material by penetration of the material into the porous collar; and curing the fluid impermeable material. The method provides a fluid impermeable seal between the casing and the individual hollow fibers. The seal prevents the unfiltered fluid from coming into contact with filtrate and provides a strong bond that is impervious to dry heat and steam sterilization at temperatures ranging from 100° C. to 150° C. and pressures from 10 psi to 60 psi.

5 Claims, 6 Drawing Sheets

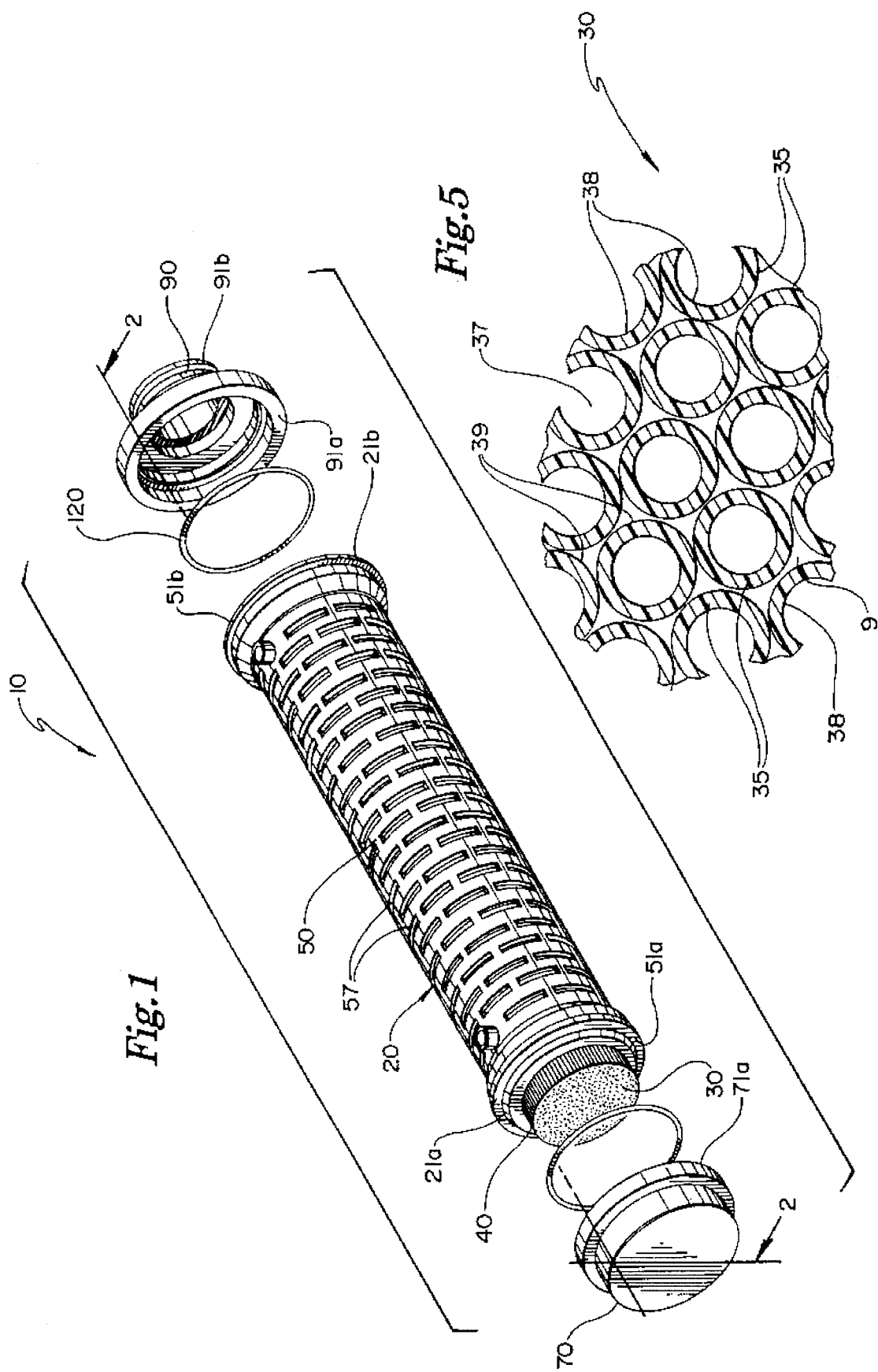

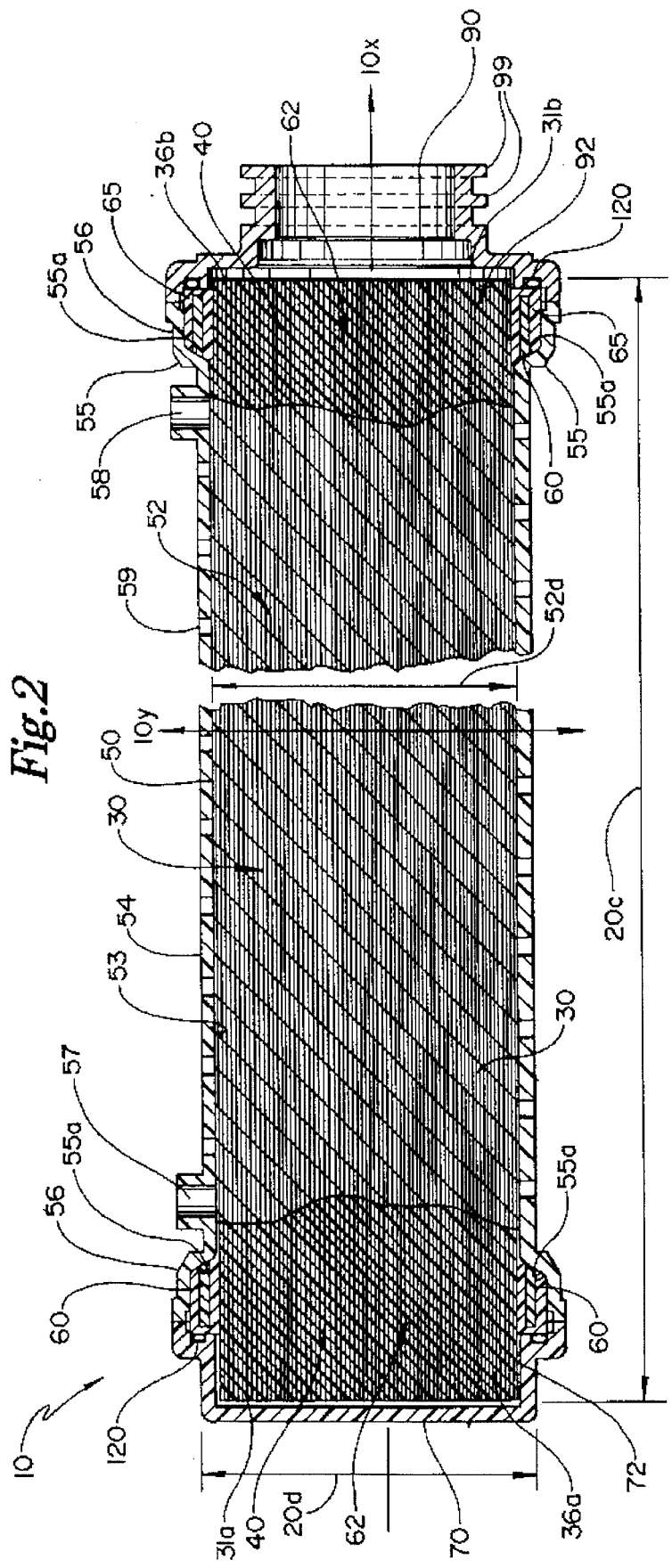

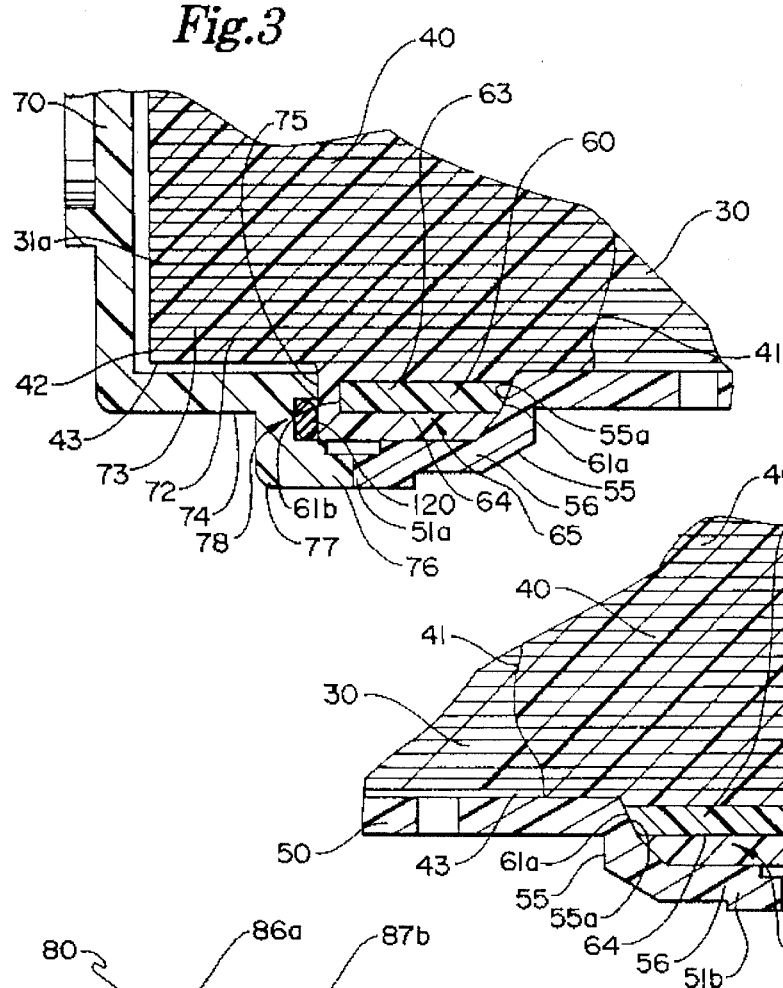# U.S. Patent Aug. 6, 1996 Sheet 3 of 6 5,543,002

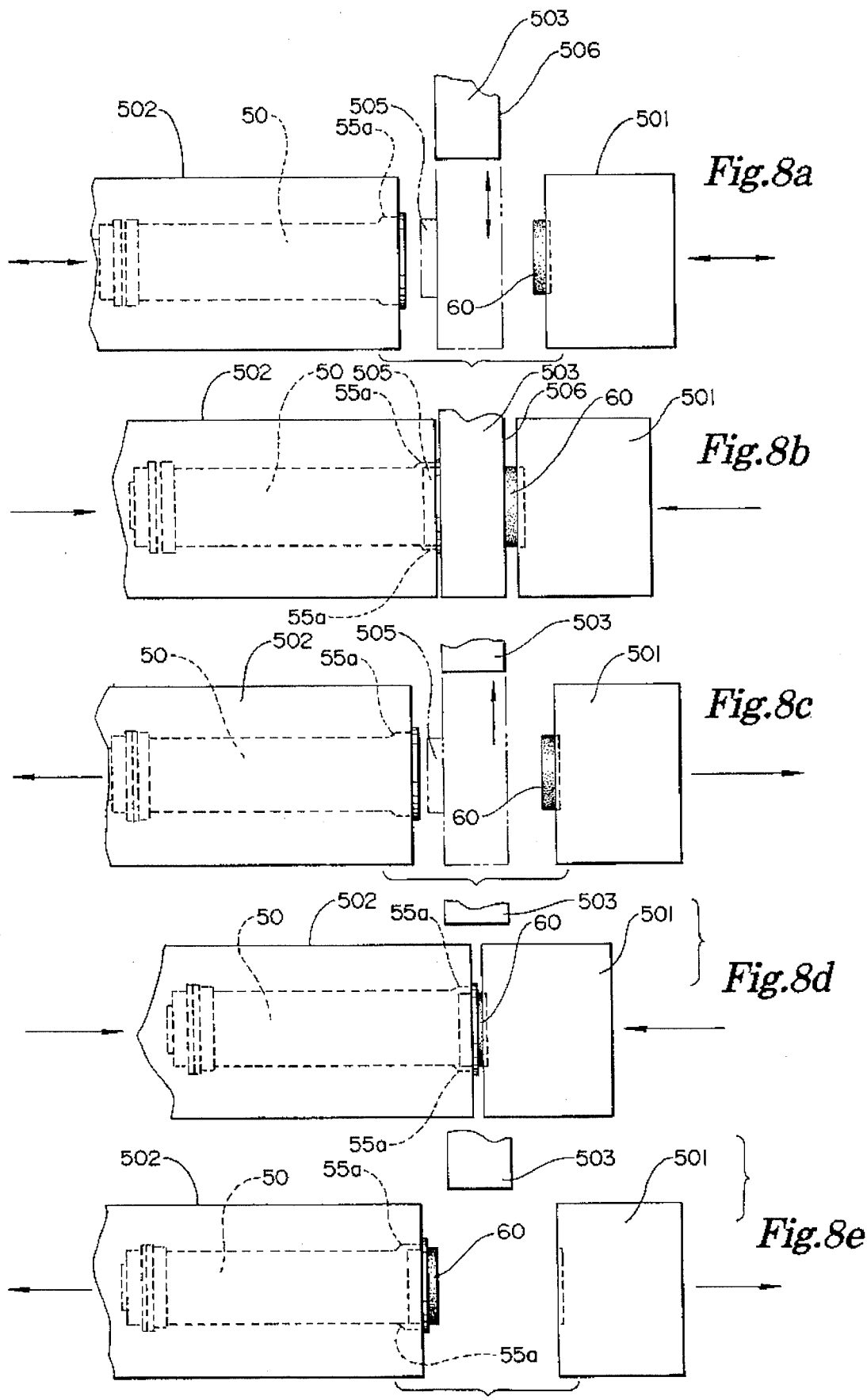

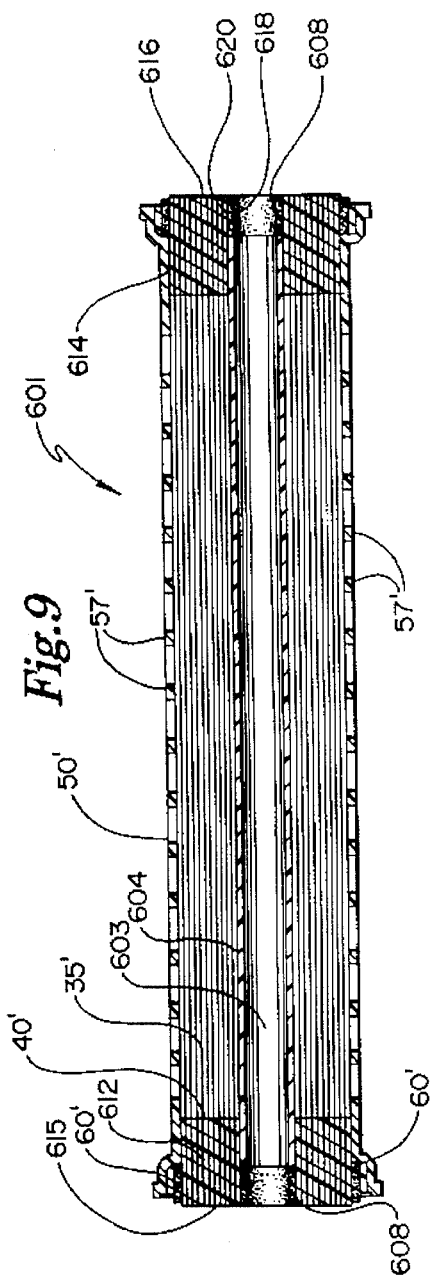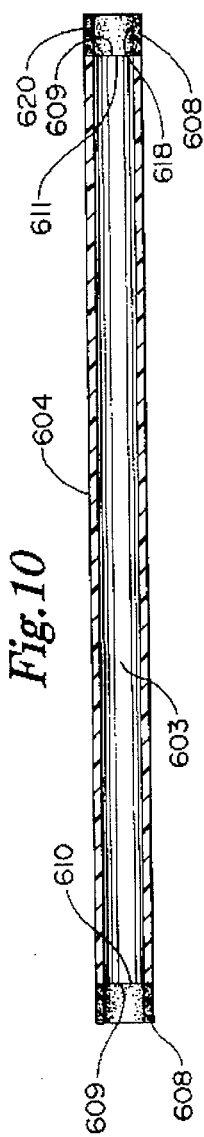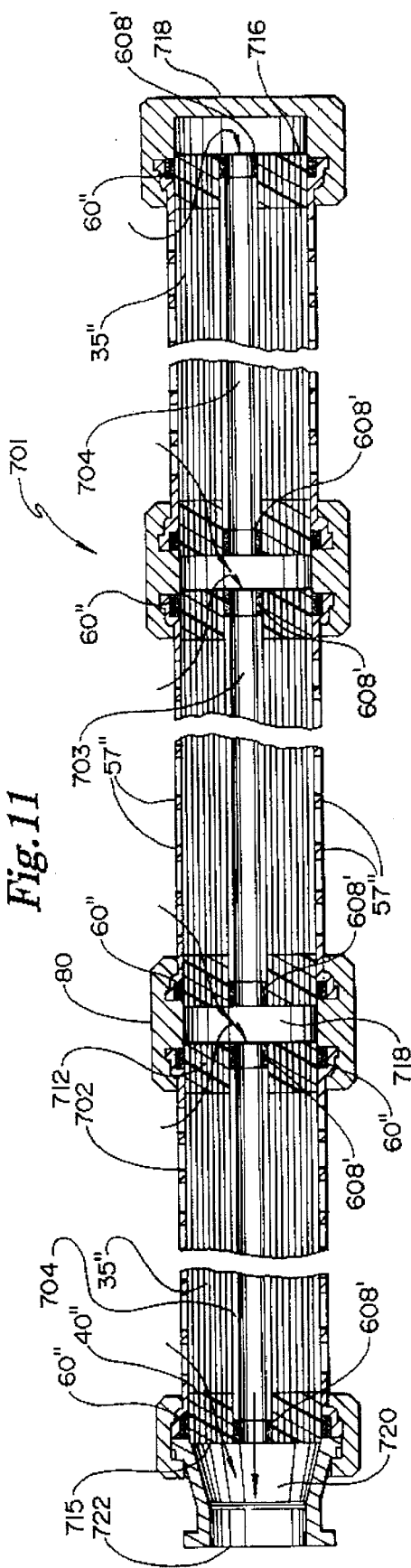

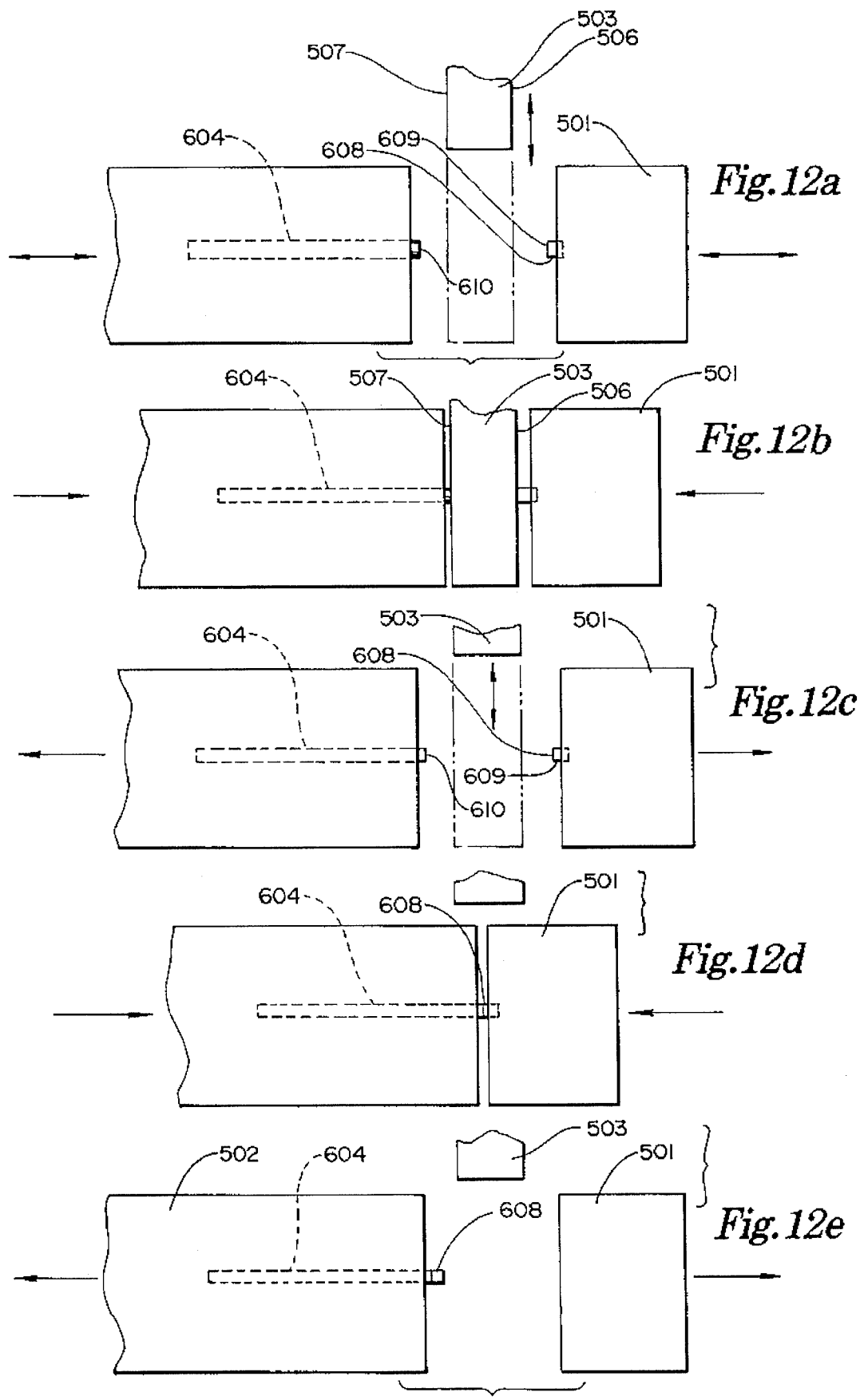

5,543,002

METHOD OF MANUFACTURE OF HOLLOW FIBER FILTER CARTRIDGE WITH POROUS RING

This application is a divisional of application Ser. No. 07/885,149 filed on May 18, 1992, the entirety of which is hereby incorporated by reference.

BACKGROUND OF THE INVENTION

1. Field of the Invention

This invention relates broadly to the manufacture of filtering apparatus. In particular, it relates to a unique method of sealingly coupling the end of a potted hollow fiber filter bundle to a module casing and the unique collar device used in conjunction therewith.

2. Description of the Related Art

Hollow fiber filter modules are known in the art. Typically, a hollow fiber filter module is comprised of a plurality of porous elongated hollow fibers having an inner diameter of about 100 μm to 1000 μm, packed at a specific density within a casing. Conventional hollow fiber permeability apparatus are used extensively in the medical field, for example in hemodialysis and in artificial lungs. Hollow fiber membrane filters are also extensively used in the purification and desalination of water commonly known as reverse osmosis filtering apparatus.

Porous, hollow fibers are used in a wide variety of permeability and filter applications because of a basic advantage over flat membranes. Available surface area is increased by choosing porous, hollow fibers thereby reducing space requirements for permeability apparatus. The hollow fiber membrane filters, therefore, provide effective filtration of a large variety of different fluids at an elevated flow rate because of the high density of surface area available for filtration.

The generally accepted method of manufacturing hollow fiber filter modules is to retain a rectilinear bundle of hollow fibers within a casing, immerse the longitudinal distal ends of the hollow fiber bundle in a potting compound which will adhere, at least temporarily, to the casing. The potting compound abuts the inner surface of the casing and occupies the interstitial void between the individual fibers thus preventing contaminated liquid from coming into contact with the filtrate. Depending on the application, a cross-sectional portion of the potting compound from one or both longitudinal ends of the potted fiber bundle is removed thus providing access to the lumen of the individual hollow fibers.

A difficulty commonly encountered in the construction of the hollow fiber filter modules is the frequent failure of the potting compound to sealingly bond to the casing and in particular the frequent loss of sealing engagement between the potting compound and the casing after autoclaving of the hollow fiber filter module. This results in the leakage of contaminated fluid into the filtrate. Thus, once or twice autoclaved the module must be discarded. This practice is costly to industries that rely on filtered fluids such as the semi-conductor, pharmaceutical, biotechnology, and medical research industries. In addition, repeatedly discarding large numbers of non-biodegradable modules out of necessity because reuse is limited is environmentally unsound.

Attempts to correct the aforementioned problems have met with limited success. For instance, attempts have been made to seal the junction of the potting component and the module with an O-ring sandwiched between the module and the distal end of the potting compound. However, this was largely unsuccessful because an O-ring is not suited for use as a primary seal. Rather, an O-ring is best suited for use as a secondary seal with the contacting surface of the module and the distal end of the potting compound functioning as the primary seal.

Accordingly, a substantial need exists for a hollow fiber filter cartridge that has a high integrity seal between the potting compound and the casing whereby leakage of contaminated fluid into the filtrate stream is prevented. A further need exists for a hollow fiber filter cartridge that can be autoclaved numerous times thus making the multiple reuse of filter cartridges practical and feasible.

SUMMARY OF THE INVENTION

It is an object of the hollow fiber filter cartridge and method of manufacture in accordance with the present invention to solve the problems outlined above that have heretofore inhibited the successful and cost-efficient multiple reuse of filter cartridges that autoclaving or heat sterilization permits. The method and apparatus in accordance with the present invention enables the use of a unique annular porous collar and ring that, as will be shown, (i) permit the repeated autoclaving of filter cartridges without any deleterious breaks in sealing integrity between the potted fiber bundle and the filter module and the potted fiber bundle and the filtrate conduit, respectively, thus making repeated reuse of modules not only feasible but also cost effective; (ii) prevents unfiltered fluids from coming into contact with filtered fluids; and (iii) permits the integrity of the filter module to remain intact during shipment because the collar and ring prevents separation of the potting plug from the casing and the filtrate conduit caused by stress vibrations.

The method of sealingly coupling a hollow fiber bundle having first and seconds ends to a casing for encasing said bundle of hollow fibers including the steps of: (i) coupling an outer peripheral edge of a porous collar to said casing, said casing having at least one open end with an inner lip proximal to said open end, wherein said outer peripheral edge of said porous collar is coupled along said inner lip; (ii) retaining said bundle of hollow fibers within a chamber defined by said casing; (iii) fluid impermeably potting said open end of said hollow fiber bundle with a fluid impermeable material; and (iv) joining said porous collar to said fluid impermeable material by penetration of said material into said porous collar. The method provides a fluid impermeable seal between the casing and the individual unpotted hollow fibers. The seal prevents the unfiltered substance from coming into contact with filtrate and provides a strong mechanical bond that is impervious to dry heat and/or steam sterilization at temperatures ranging from 100° C. to 150° C. and pressures from 10 psi to 60 psi.

The unique hollow fiber filter cartridge in accordance with the present invention broadly includes (i) a casing for encasing a bundle of hollow fibers, said casing having at least one open end with an inner lip in said casing proximal to said open end; and (ii) a porous collar having first and second peripheral edges, at least one of which is coupled to said casing along said inner ledge.

A second embodiment of the hollow fiber filter assembly in accordance with the present invention broadly includes (i) a casing for encasing a bundle of hollow fibers, said casing defining an interior chamber, said casing having at least one open end with an inner lip in said casing proximal to said open end; (ii) a porous collar having a peripheral edge coupled to said casing along said inner lip; (iii) at least one potting plug comprising a fluid impermeable material; (iv) a bundle of rectilinear hollow fibers disposed within said interior chamber of said casing, said bundle having first and second open ends, at least one of said ends rigidly disposed within said plug; (v) wherein said fluid impermeable material of said potting plug and said porous collar are joined by penetration of said fluid impermeable material into said porous collar.

One of the advantages of the present invention is that the hollow fiber filter assembly may be subject to dry heat and/or steam sterilization for up to fifteen times without any deleterious breaks in sealing integrity between the potted fiber bundle and the filter module. Another advantage of the present invention is that the porous collar impregnated with the fluid impermeable potting material prevents the unfiltered contaminated fluid from coming into contact with the filtrate. Still another advantage of the present invention is that the integrity of the filter module remains intact during shipment because the collar prevents separation of the potting plug from the casing caused by stress vibrations. Perhaps most significantly, the present invention provides the potential for significant cost reductions in industries utilizing hollow fiber filters by making the multiple reuse of filters practical and economically feasible.

These and other objects and advantages of the present invention will become apparent during the course of the following detailed description and appended claims. The invention may best be understood with reference to the accompanying drawings, wherein an illustrative embodiment is shown.

BRIEF DESCRIPTION OF DRAWINGS

FIG. 1 is an exploded perspective view of one embodiment of the hollow fiber filter cartridge of the present invention;

FIG. 2 is a longitudinal cross-sectional view of the hollow fiber filter cartridge taken along line 2—2 in FIG. 1 showing the invention in assembled form;

FIG. 3 is an enlarged fragmentary sectional view of a portion of FIG. 2 showing the juncture of the end cap and the casing;

FIG. 4 is an enlarged fragmentary sectional view of a portion of FIG. 2 showing the juncture of the seal adaptor and the casing;

FIG. 5 is a greatly enlarged transverse section of a longitudinal end of the hollow fiber module depicting the open ended character of the hollow fibers;

FIG. 6 is cross-sectional view of a connecting device used to couple multiple filter modules;

FIG. 7 is cross-sectional view of a flow control end component of the present invention;

FIGS. 8a—8e are schematic diagrams depicting the relative positioning of a casing, an annular collar, and a heated platen when practicing one embodiment of the manufacturing process of the present invention. The various stages include (i) a start-up stage (FIG. 8a), (ii) a melt stage (FIG. 8b), (iii) a platen-withdrawal stage (FIG. 8c), (iv) a fusing stage (FIG. 8d), and (v) a final stage (FIG. 8e);

FIG. 9 is a cross-sectional view of a second embodiment of a filter cartridge utilizing the porous collar and porous ring of the present invention;

FIG. 10 is a cross-sectional view of the central tube defining a filtrate conduit and porous ring in accordance with the present invention;

FIG. 11 is a cross-sectional view of a fourth embodiment of a filter cartridge in accordance with the present invention;

FIGS. 12a–12e are schematic diagrams depicting the relative positioning of the central tube, an annular ring, and a heated platen when practicing one embodiment of the manufacturing process of the present invention. The various stages include (i) a start-up stage (FIG. 12a), (ii) a melt stage (FIG. 12b), (iii) a platen-withdrawal stage (FIG. 12c), (iv) a fusing stage (FIG. 12d), and (v) a final stage (FIG. 12e)

DETAILED DESCRIPTION OF THE INVENTION

Metric Conversion Chart

As utilized herein, including the claims, the following units are convertible to the metric system as indicated:

1 in$^3$=16.39 cm$^3$ 1 ft$^2$=929.03 cm$^2$ 1 psi=1 lb/in$^2$=0.068 atm

Hollow Fiber Filter Module

Referring to FIGS. 1–4, the hollow fiber filter module 20 broadly includes a hollow fiber bundle 30 retained within a generally cylindrical casing 50, or casing means, wherein the longitudinal ends 31a, 31b of the hollow fiber bundle 30 are potted within a potting compound 40.

The casing 50 may have any desired cross-sectional configuration, for example rectangular or square, but for purposes of affording compatibility with a majority of conventional standard commercial filter housings (not shown) the casing 50 preferably has a circular cross-sectional configuration. The casing 50 has first 51a and second 51b open ends and defines an internal cylindrical chamber 52. The internal cylindrical chamber 52 preferably has a volume of substantially 5 in$^3$ to substantially 2000 in$^3$, more preferably 10 in$^3$ to 1000 in$^3$, and most preferably has a volume of substantially 15 in$^3$ to substantially 100 in$^3$. The ends 51a, 51b of the casing 50 are shaped to define laterally extending annular extensions 55 and a longitudinally extending annular flange 56 projecting from the outer periphery of the annular extensions 55 such that the diameter 52d of the chamber 52 defined by the casing 50 is greater at the extreme longitudinal ends 51a, 51b of the casing 50.

Casings may be integrally molded to form a unitary piece without perforations or may have, as depicted, a plurality of lateral perforations 57 for facilitating the flow of fluid through the casing 50. The extent to which the casing 50 is opened to fluid flow requires a balancing of the competing needs to provide mechanical support for the rather fragile individual hollow fibers 35 and maximize ingress/egress of fluid through the casing 50. Generally, casings 50 that are perforated preferably will have an open surface area of about 20% to 75% thus providing an effective balance between these competing requirements.

The casing 50 may be made from any fluid impermeable plastic such as polyethylene, polycarbonate, polyvinylchloride and polyethyleneterepthalate; or metals such as stainless steel, aluminum, copper and zinc; or glass. The casing 50 may also be manufactured using fluid permeable materials, such as porous polypropylene, porous polycarbonate, porous stainless steel, porous brass, or any other suitable material that will melt during a sintering process. Selection of the preferred casing material depends upon a number of factors including the particular fluid to be filtered, compatibility with the potting compound 40, the mechanical abuse to which the casing 50 will be subjected, cost, etc. For reasons of minimizing cost and facilitating a strong sealing connection between the annular collar 60 and the casing 50, the preferred embodiment is preferably constructed from a thermoplastic resin such as polyethylene, polypropylene, polyvinylchloride, or like plastics.

Annular, porous collars 60 are coupled by heat pressing, fusion welding or other suitable means to the inner, lateral, annular lip 55a proximate the longitudinal open ends 51a, 51b of the casing 50 along a first peripheral edge 61a of the collars 60 such that an open-faced annular channel 65 is formed between the longitudinal annular flanges 56 of the casing 50 and the annular, porous collars 60.

The annular collars 60 may be constructed from any material capable of being sealingly coupled to the casing 50 and being permeated by the potting compound 40 to an extent sufficient to create a strong mechanical bond between the collar 60 and the potting compound 40 thereby rendering the collar 60 impermeable to fluid flow. Suitable materials include specifically, but not exclusively: porous metals such as sintered aluminum; porous plastics such as foamed polyurethane and sintered polyolefins; and porous glass such as bonded fiberglass. In order to facilitate bonding of the collar 60 to the casing 50, it is preferable to manufacture the collar 60 from the same material as the casing 50.

The collar 60 must possess a pore size distribution which is effective for ensuring that the potting compound 40 will be able to permeate into the pores thereby creating a strong mechanical sealing bond between the potting compound 40 and the collar 60 as well as render the collar 60 impermeable to the fluid being filtered. While acceptable pore size distributions are clearly dependent upon the particular potting compound 40 which is employed, generally, it is believed that pores of less than about five μm do not generally permit sufficient penetration of the potting compound 40 while pores of greater than about 500 μm tend to weaken the seal between the potting compound 40 and the collar 60 as well as weakening the mechanical bond between the collar 60 and the casing 50. The preferred embodiment of the present invention utilizes a pore size of between 5 μm and 500 μm, and more preferably between 50 μm and 300 μm, and most preferably between 100 μm and 150 μm.

The hollow fiber bundle 30 is retained within the chamber 52 defined by the casing 50 with the longitudinal ends 31a, 31b of the fiber bundle 30 projecting past the longitudinal ends 51a, 51b of the casing 50. The manufacture of hollow fibers 35 is widely understood and a wide variety of hollow fibers 35 may be purchased from a number of different sources. In general, hollow fibers 35 having an outer diameter as small as about 100 μm and a wall thickness as small as about 10 μm may be manufactured from a variety of different materials including polyolefins, polysulfones, polyvinylidene fluoride, cellulose esters, and other suitable materials.

Selection of the preferred size of the individual hollow fibers 35 is generally dependent upon a number of factors including the particular fluid to be filtered, the desired contaminant(s) to be removed, the desired filtration efficiency, etc. Individual hollow fibers 35 having an inside diameter 35d of less than about 100 μm are difficult and expensive to manufacture wile individual hollow fibers 35 having an inside diameter 35d of greater than about 10000 μm result in a significant decrease in the volumetric density of hollow fiber surface area available for contacting the fluid to be filtered. In the preferred embodiment, the inside diameter 35d of the individual hollow fibers 35 is about 100 μm to about 1000 μm, more preferably about 200 μm to 500 μm and most preferably about 250 μm to 350 μm. The external surface area of the hollow fiber bundle available for filtration is substantially 1 ft² to substantially 40 ft².

In a similar fashion, selection of the preferred material of construction for the individual hollow fibers 35 requires a review and analysis of these same factors. Generally, when the hollow fibers 35 are intended to be used for the high purity filtration of water, the individual hollow fibers 35 of choice are those manufactured from polysulfones.

In accordance with generally accepted practices in the manufacture of hollow fiber filter modules 20, the packing density of the individual hollow fibers 35 within the hollow fiber bundle 30 should be such that the area occupied by the individual hollow fibers 35 is about 30% to 75%, more preferably 40% to 50%, and most preferably 40% to 45% of the casing cross-sectional area available for fibers. A packing density of greater than about 75% significantly interferes with the ability to sealingly pot the longitudinal ends 31a, 31b of the hollow fiber bundle 30 while a packing density of less than about 40% decreases the filtration capacity of the hollow fiber filter module 20 without any corresponding benefits.

The longitudinal ends 31a, 31b of the hollow fiber bundle 30 are sealingly potted with a suitable potting compound 40 which occupies the interstitial void volume between the individual hollow fibers 35 and the annular channel 65 between the longitudinal annular flange 56 of the casing 50 and the annular collar 60. The potting compound 40 functions to (i) prevent fluid from passing through the interstitial void space 9 between the hollow fibers 35; (ii) fixedly attach the potted hollow fiber filter ends to the case by integrally melding with the porous ring; and (iii) hold the hollow filter fibers together in a bundle.

Selection of a suitable potting compound 40 depends upon several variables including the particular fluid to be filtered, the material from which the hollow fibers 35 are constructed, the material from which the casing 50 is constructed, the porosity of the annular collar 60, etc. The compound 40 must possess sufficient initial fluidity to permit penetration of the potting compound 40 into the interstitial void volume between the individual hollow fibers 35 and into the pores of the annular collar 60 while resulting in a solid plug which is impermeable to the fluid being filtered. A number of suitable potting compounds are well known and include such curable resins as polyurethanes, epoxies, unsaturated polyesters, and silicones.

The potting compound 40 permeates the pores of the annular collar 60 of both the inner 63 and outer 64 peripheral surface so as to render the collar 60 impermeable to fluid flow, prevents fluid flow between the juncture of the potting compound 40 and the collar 60, and forms an extremely strong mechanical bond between the potting compound 40 and the collar 60.

The longitudinal depth to which the potting compound 40 should be permitted to penetrate into the hollow fiber bundle 30 requires a balancing between the competing interests of maximizing the hollow fiber surface area available for effecting filtration (decrease depth) and minimizing the risk of leakage around or through the potting compound 40 (increase depth). Generally, a depth of about 1 to 5 centimeters provides an effective balance between these competing interests. In addition, in order to improve the effectiveness of the seals between the potting compound 40, collar 60, and casing 50, the potting compound 40 preferably penetrates a sufficient distance into the hollow fiber bundle 30 to extend beyond the juncture of the annular collar 60 and the casing 50 so that the potting compound 40 fills all the pores in the collar 60 and renders the entire length of the collar 60 impermeable to the fluid being filtered.

The longitudinal ends 31a, 31b of the potted hollow fiber bundle 30 are cut to open the longitudinal ends 36a, 36b of the hollow fiber lumens 37.

Incorporation of the annular collar 60 into the hollow fiber filter module 20 results in superior bonding of the potting compound 40 to the casing 50 such that the seal between the potting-impregnated annular collar 60 and the casing 50 routinely survives repeated sterilization by autoclaving.

Hollow Fiber Filter Cartridge

Referring generally to FIGS. 1–4, the hollow fiber filter cartridge 10 utilizing the annular collar of the present invention is based upon a hollow fiber filter module 20 with flow control end components 100 coupled to the longitudinal ends 21a, 21b of the module 20.

The flow control end components 100 direct the ingress/egress of fluid at the longitudinal ends 21a, 21b of the module 20 while maintaining separation of the fluid passing through the lumen 37 of the hollow fibers 35 and the fluid in contact with the outer surface 39 of the hollow fibers 35.

The first longitudinal end 101a of the flow control end component 100 is configured to sealingly engage a longitudinal end 21a, 21b of the hollow fiber filter module 20 and is therefore substantially the same regardless of the intended function of the specific flow control end component. Referring to FIG. 7, one embodiment of the first longitudinal end 101a of a flow control end component 100 includes an L-shaped in cross section laterally extending annular extension 107, a horizontally extending inner annular flange 105 projecting from the inner periphery of the annular extension 107, and a longitudinally extending inner annular flange 106 projecting from the inner periphery of the annular extension 107.

Inner annular flange 105 fixedly positions O-ring 120 during the welding process. Consequently, the inner annular flange 105 may be omitted if O-ring 120 is not used. The outer annular flange 106 is configured to match longitudinal ends 51a, 51b of the casing 50 for effecting sealing engagement between the flow control end component 100 and the casing 50. In addition, the inner 105 and outer 106 longitudinal flanges cooperate with the annular extension 107 to form an open-faced peripheral annular channel 108.

The second longitudinal end 101b of the flow control end component 100 may take any of several configurations depending upon the intended function of the flow control end component 100.

When the flow control end component 100 is intended to function as an end cap 70, or closed collection chamber 718, the second longitudinal end 100b is simply completely enclosed.

When the flow control end component 100 is intended to function as a union adaptor 80, the second longitudinal end 101b is simply a mirror image of the first longitudinal end 101a for facilitating longitudinal end-to-end coupling of multiple hollow fiber filter modules 20.

When the flow control end component 100 is intended to function as a seal adaptor 90, the second longitudinal end 101b includes a pair of longitudinally spaced, outer, annular, lateral flanges 99 for sealingly engaging the inner surface of an inlet/outlet port (not shown) in conventional filter housings (not shown).

The flow control end components 100 are sealingly attached to the longitudinal ends 21a, 21b of the hollow fiber filter module 20 by (i) melting a longitudinal end 21a, 21b of the hollow fiber filter module 20, (ii) melting the first longitudinal end 101a of the flow control end component 100, and then (iii) contacting the melted ends under pressure until they sealingly fuse together.

As stated previously, O-ring 120 may be optionally sealingly positioned between the lateral annular extension 107 on the flow control end component 100 and the periphery of the external longitudinal end 42 of the trimmed potting composition 40 to function as a secondary seal against the flow of fluid between the juncture of the hollow fiber filter module 20 and the flow control end component 100. An open-faced annular peripheral channel 108 may be provided proximate the first longitudinal end 101a of the flow control end component 100 for securing and positioning the O-ring 120.

FIG. 9 depicts an alternative embodiment of the hollow fiber filter cartridge 601 utilizing the present invention. The hollow fiber filter cartridge 601 includes cylindrical casing or casing means 50' shown enclosing central, nonpermeable tube 604 defining filtrate conduit 603 and a plurality of porous hollow fibers 35'. Casing 50' includes an annular, porous collar 60' identical to the annular collar previously discussed. The nonpermeable, central tube 604 includes annular porous rings 608 with coupling edges 609. The porous rings 608, best seen in FIG. 10, are coupled to first and second outer peripheral edges 610, 611 of tube 604 by heat pressing, fusion welding or other suitable means by the method described herein. Porous rings 608 are constructed, similarly to the annular porous collar 60, from any material capable of being sealingly coupled to the filtrate conduit 604 and of being permeated by the potting compound 40' to an extent sufficient to create a strong mechanical bond between the rings 608 thereby rendering the rings 608 impermeable to fluid flow. Suitable materials include porous metals such as sintered aluminum; porous plastics such as foamed polyurethane and sintered polyolefins; and porous glass such as bonded fiberglass. Except for dimensional aspects, All other characteristics, including pore size, are identical to the porous collar 60 previously discussed.

The assembly of porous, hollow fibers and central tube 604 with porous rings 608 has a first potting-impregnated end 612 and a second potting-impregnated end 614. First and second ends 612, 614 are potted using the conventional means and materials previously disclosed. The potting compound 40' permeates the pores of the porous rings 608 of both the inner and outer peripheral surfaces 618, 620 so as to render the rings 608 impermeable to fluid flow and forms an extremely strong mechanical bond between the potting compound 40', the rings 608, the hollow fibers 35', the annular collars 60' and the casing 50'. This provides a filter cartridge 601 that is extremely durable and withstands repeated autoclaving without any breaks in integrity. After the ends 615, 616 have been potted they are cut to define open flow paths from first end 615 to second end 616.

The filter cartridge 601 in accordance with the second embodiment may include an end cap 70 as previously described and an open-ended flow control end component 100 for egress of filtrate.

In a filter cartridge 601 in accordance with the second embodiment, fluid enters the perforations 57' of casing 50' and is filtered through the walls of porous, hollow fibers 35' into the bores (not shown) thereof and simultaneously flows toward first and second open ends 615, 616. Fluid exiting the porous, hollow fibers 35' at second end 616 enters a closed collection chamber (not shown) equivalent to chamber 718 for shunting through central filtrate conduit 603 to the first open end 615 and lower manifold (not shown) equivalent to manifold 720. Filtered fluid exiting from porous, hollow fibers 35' at first end 615 and shunted fluid exiting from the filtrate conduit 703 defined by central tube 604 flow together out of lower manifold (not shown).

A third embodiment 701 of a filter cartridge utilizing the present invention is depicted in FIG. 11. The filter cartridges utilizing the annular collar and porous ring of the present invention may also be connected in series. Stacked filter cartridges are known in the art but for reasons previously stated cannot be used multiple times because repeated autoclaving causes breaks in integrity between the potting compound and the casing. Each casing and each central tube of the "stacked" filter cartridges, therefore, utilizes an annular collar and a porous ring, respectively.

In a "stacked" filter cartridge 701, as depicted, fluid enters the perforations of housing and is filtered through the walls of porous, hollow fibers 35" into the bores (not shown) thereof and simultaneously flows toward first and second ends 715, 716. Fluid exiting the porous, hollow fibers 35" at second end 716 enters the closed collection chamber 718 for shunting through central filtrate conduit 704 to lower manifold 720. Filtered fluid exiting from porous, hollow fibers 35" at first end 715 and shunted fluid exiting from the filtrate conduit 703 defined by central tube 704 flow together out of portal 722 of lower manifold 720 for collection.

Assembly

For ease of understanding and for reasons of clarity, this discussion on assembly is based on the first embodiment of the hollow fiber filter cartridge which includes a hollow fiber filter module having an annular collar. However, the assembly process with certain adaptations relative to size applies to all embodiments disclosed herein.

The hollow fiber filter module 20 may be constructed by sequentially (i) attaching the annular collars 60 to the casing 50 by heat pressing, fusion welding or other suitable means (ii) inserting the hollow fiber bundle 30 into the casing 50, (iii) potting the longitudinal ends 31a, 31b of the hollow fiber bundle 30, and (iv) cutting the longitudinal ends 31a, 31b of the potted fiber bundle 30 to permit access to the lumen 37 of the hollow fibers 35.

The collars 60 may be fixedly attached to the inner annular lip 55a of casing 50 along a first longitudinal end 61a of the collars 60 by any means effective for producing a strong bond which is impermeable to the fluid to be filtered. Suitable techniques include adhesive bonding, sonic welding, heat fusing, heat pressing and fusion welding. If the material is other than a plastic, one may achieve a suitable bond by means such as conventional welding, mechanical fasteners, brazing, soldering or other suitable means.

The hollow fiber bundle 30 must be of sufficient longitudinal length such that the longitudinal ends 31a, 31b of the fiber bundle 30 project past the longitudinal ends 51a, 51b of the casing 50 so that the extreme longitudinal ends 31a, 31b of the bundle 30 may be trimmed to permit access to the lumen 37 of the hollow fibers 35 without interference from the casing 50.

The longitudinal ends 31a, 31b of the hollow fiber bundle 30 may be effectively potted by injecting the potting material into the hollow fiber bundle and casing, applying centrifugal force to allow the potting compound to flow into the interstitial void volume 9 between hollow fibers 35 and surround the collar 60, removing the combination bundle 30 and casing 50 from the potting compound and then allowing the potting compound 40 to cure. Additionally, one may simply dip the hollow fiber bundle 30 and casing 50 into a supply of the potting compound and then allow the potting compound 40 to cure.

The longitudinal ends 31a, 31b of the potted hollow fiber bundle 30 are then cut by any one of the customary procedures, for example, a knife-edged blade having a smooth, toothless edge.

Referring generally to FIGS. 8a–8e, one method of constructing a hollow fiber filter module 20 having an annular collar 60 sealingly fused to the casing 50 is through the use of a transversely reciprocable heated platen 503 and a pair of uniaxially reciprocable retention arms 501, 502 configured for retention of the casing 50 and the annular collar 60. Heated platen 503 includes projection 505 that meltingly contacts casing 50 along the inner, lateral annular lip 55a.

Referring to FIG. 8a, the "commencement stage" of the process has the first and second reciprocable retention arms 501, 502 separated and the platen 503 withdrawn from between the retention arms 501, 502. Annular collar 60 is positioned within the first reciprocable retention arm 501 with the first longitudinal end 60a of the collar 60 facing the second retention arm 502. In a similar fashion the casing 50 is positioned within the second retention arm 502 with the longitudinal end 50a of the casing 50 to be attached to the annular collar 60 facing the first retention arm 501.

Referring to FIG. 8b, the "melt stage" of the process has platen 503 and projection 505, heated to a temperature sufficient to soften the annular collar 60 and the annular lip 55a of casing 50 positioned between the retention arms 501, 502 and the retention arms 501, 502 extended toward the heated platen 503 until the projection 505 contacts inner, annular lip 55a of the casing 50 and the flat exterior surface 506 of platen 503 contacts the first longitudinal end 60a of the annular collar 60. The lip 55a of casing 50 and the annular collar 60 are held against the projection 505 and the flat exterior surface 506 of heated platen 503, respectively, for a period of time sufficient to melt the desired depth of material. The preferred embodiment contact the platen 503 with the casing 50 for five seconds.

Referring to FIG. 8c, the "intermediate stage" of the process effects separation of the retention arms 501, 502 and withdrawal of the heated platen 503 to the positions they occupied during the "commencement stage."

Referring to FIG. 8d, the "fusing stage" of the process maintains the platen 503 in the withdrawn position while the retention arms 501, 502 are extended towards one another until the melted inner annular lip 55a of the casing 50 and the melted longitudinal end 60a of the annular collar 60 contact one another. The casing 50 and the annular collar 60 are pressed against one another until the melted portions are sufficiently melded and solidified to prevent accidental slippage and a unitary component is created. Sufficient pressure must be applied to ensure continuous contact along the entire periphery thereof, generally about 10 to 500 psi.

Lastly, referring to FIG. 8e, the "final stage" of the process maintains the platen 503 in the withdrawn position while separating the retention arms 501, 502 so as to permit removal of the unitary combination of casing 50 and annular collar 60.

Referring to FIG. 12, an almost identical process is utilized for coupling the porous rings 608 to filtrate conduit 604. Briefly, the "commencement stage" of the process depicted in FIG. 12a has the first and second reciprocable retention arms 501, 502 separated and the platen 503 withdrawn from between the retention arms 501, 502. Annular ring 608 is positioned within the first reciprocable retention arm 501 with the coupling edge 609 of ring 608 facing the second retention arm 502. In a similar fashion the central tube 604 is positioned within the second retention arm 502 with the first peripheral edge 610 of tube 604 to be attached to the annular ring 608 facing the first retention arm 501.

Referring to FIG. 12b, the "melt stage" of the process has platen 503 heated to a temperature sufficient to soften the annular ring 608 and the central tube 604 positioned between the retention arms 501, 502 and the retention arms 501, 502 extended toward the heated platen 503 until the first peripheral edge 610 of the filtrate conduit 604 contacts the flat exterior surface 507 of platen 503 and flat exterior surface 506 of platen 503 contacts the coupling edge 609 of ring 608. The surfaces are held against the heated platen 503 for a period of time, generally five seconds, sufficient to melt the desired depth of material.

Referring to FIG. 12c, the "intermediate stage" of the process effects separation of the retention arms 501, 502 and withdrawal of the heated platen 503 to the positions they occupied during the "commencement stage."

Referring to FIG. 12d, the "fusing stage" of the process maintains the platen 503 in the withdrawn position while the retention arms 501, 502 are extended towards one another until the melted outer edge of ring 608 and the peripheral edge 610, 611 of filtrate conduit 604 contact one another. The conduit 604 and the rings 608 are pressed against one another until the melted portions are sufficiently melded and solidified to prevent accidental slippage and a unitary component is created. Sufficient pressure must be applied to ensure continuous contact along the entire periphery thereof, generally about 10 to 500 psi.

Lastly, referring to FIG. 12e, the "final stage" of the process maintains the platen 503 in the withdrawn position while separating the retention arms 501, 502 so as to permit removal of the unitary combination of filtrate conduit 604 with coupled annular porous rings 608.

Operation

In use, one embodiment of the hollow fiber filter cartridge 10 is simply placed within a standard commercial filter housing (not shown) with the second longitudinal end 91b of the seal adaptor 90 sealingly engaged within the outlet port (not shown) of the housing (not shown) and the contaminant-containing fluid directed under pressure through an inlet port (not shown) in the housing (not shown) and into contact with the outer surface area 39 of the hollow fibers 35. In practice, the contaminating fluid could come in contact with the lumen, rather than the outer surface 39.

The contaminant-containing fluid flows (i) through the inlet port (not shown) in the housing (not shown) and into contact with the casing 50, (ii) through the perforations 57 in the casing 50 and into the interstitial void volume between the individual hollow fibers 35 located between the potting plugs 40, (iii) through the pores in the walls of the hollow fibers 35 and into the lumen 37 of the hollow fibers 35 so as to remove the contaminants, (v) down the hollow fiber lumen 37 and into the chamber 92 defined by the seal adaptor 90, and finally (vi) out of the filter housing (not shown) through the outlet port (not shown). The integral seal created by the method disclosed herein between the annular collar 50 and the casing 60 separates the unfiltered contaminant-containing fluid from the filtrate fluid and prevents the unfiltered fluid entering the hollow fibers from contacting the filtrate as it exits into the chamber 92 defined by the seal adaptor 90 and out the outlet port (not shown).

Although the description of the preferred embodiment has been presented, it is contemplated that various changes, such as, without limitation, changes of shape, of either the casing, the end caps, or the annular porous collar or ring, are changes of form, not substance, and could be made without deviating from the spirit of the present invention. It is therefore desired that the present embodiment be considered in all respects as illustrative, not restrictive, and that reference be made to the appended claims rather than to the foregoing description to indicate the scope of the invention.

We claim:

1. A method of sealingly coupling an annular porous collar to a casing for encasing a bundle of hollow fibers comprising:

(a) providing an annular porous collar having a first and second outer peripheral edges, said annular porous collar including pores having a pore size distribution from about 5 μmm to 500 μm;

(b) providing a casing having first and second longitudinal ends, said casing defining a central chamber, said chamber having first and second ends wherein said longitudinal ends of said casing each include an inner, lateral, annular lip proximal to each of said ends; and (c) coupling said first outer peripheral edge of said annular porous collar to at least one of said inner, lateral, annular lips of said casing; wherein said casing, said annular porous collar and a potting plug of a fluid impermeable material are sealingly joined by penetration of said fluid impermeable material through said pores of said annular porous collar.

2. The method of sealingly coupling an annular porous collar to a casing for encasing a bundle of hollow fibers as recited in claim 1 wherein said porous collar is coupled by said first outer peripheral edge to said inner, lateral, annular lip of said casing by heat pressing.

3. The method of sealingly coupling an annular porous collar to a casing for encasing a bundle of hollow fibers as recited in claim 1 wherein said annular porous collar is coupled by said first outer peripheral edge to said inner, lateral, annular lip of said casing by fusion welding.

4. The method of sealingly coupling an annular porous collar to a casing for encasing a bundle of hollow fibers as recited in claim 1 wherein the step of providing an annular porous collar further comprises providing an annular porous collar of porous plastic polyurethane.

5. The method recited in claim 1 wherein said casing, said annular porous collar and said potting plug are sealingly joined by penetration of said fluid impermeable material through all of said pores of said annular porous collar.

* * * * *